United States Patent [19]

Dommer et al.

[11] Patent Number: 5,183,524
[45] Date of Patent: Feb. 2, 1993

[54] DEVICE FOR INSERTION BY WELDING OF A PLASTIC PIPE SECTION INTO A SHAPED PLASTIC PIECE

[76] Inventors: Armin Dommer, Eichweg 13; Dieter Dommer, Bahnhofstr. 5, both of 7257 Ditzingen, Fed. Rep. of Germany

[21] Appl. No.: 678,845

[22] Filed: Apr. 2, 1991

[30] Foreign Application Priority Data

Apr. 2, 1990 [DE] Fed. Rep. of Germany ....... 4010541

[51] Int. Cl.$^5$ ............................................. B29C 65/18
[52] U.S. Cl. .................... 156/423; 156/499; 156/503; 219/445; 219/478
[58] Field of Search .................. 156/158, 304.2, 304.6, 156/294, 423, 499, 503; 219/478, 480, 537, 243, 218, 445, 446; 29/40, 53, 55

[56] References Cited

U.S. PATENT DOCUMENTS

| | | | |
|---|---|---|---|
| 520,079 | 5/1894 | Quint | 29/40 |
| 917,468 | 4/1909 | Libby | 29/40 |
| 2,773,165 | 12/1956 | Konrad | 219/445 |
| 3,727,289 | 4/1973 | Bemelmann et al. | 156/503 |
| 3,803,680 | 4/1974 | Kuhnert | 29/40 |
| 4,352,708 | 10/1982 | McElroy | 165/503 |
| 4,714,513 | 12/1987 | McAlister | 156/423 |

FOREIGN PATENT DOCUMENTS

| | | |
|---|---|---|
| 1554800 | 11/1963 | Fed. Rep. of Germany . |
| 2308078 | 8/1974 | Fed. Rep. of Germany ...... 156/503 |
| 2734911 | 8/1977 | Fed. Rep. of Germany . |
| 0274911 | 6/1971 | U.S.S.R. ................. 156/503 |
| 0787178 | 12/1980 | U.S.S.R. ................. 156/499 |
| 0714792 | 9/1954 | United Kingdom ............... 29/40 |

*Primary Examiner*—Michael W. Ball
*Assistant Examiner*—Steven D. Maki
*Attorney, Agent, or Firm*—Speckman & Pauley

[57] ABSTRACT

A device for insertion of a plastic pipe section into a shaped plastic piece for welding in accordance with a heating element method. Two carriages, which each have a clamping element, are positioned on a base frame and can be displaced with respect to each other with a setting device. A heating device is pivotal, into and out of position between the two clamping elements with the clamped plastic pipe section and the clamped shaped plastic piece, by using levers pivotally mounted on the base frame. The heating device has a setting element with a cupped section for placing over the plastic pipe section and a cylindrical section for insertion into the shaped plastic piece. Universal use, requiring no set-up time, of the device for different diameters is achieved with the heating device having a plurality of different heating elements, each with a cupped and a cylindrical section. The heating device is pivotally mounted on the pivot levers in such a way that with the heating device in a set position, the heating elements can be optionally rotated between the two clamping elements, with the clamped plastic pipe section and the clamped shaped plastic piece.

8 Claims, 1 Drawing Sheet

DEVICE FOR INSERTION BY WELDING OF A PLASTIC PIPE SECTION INTO A SHAPED PLASTIC PIECE

BACKGROUND OF THE INVENTION

1. Field of the Invention

This invention relates to a device for insertion of a plastic pipe section into a shaped plastic piece for welding, in accordance with a heating element method. Two carriages, which have clamping elements, are positioned on a base frame and are displaceable relative to each other with a setting device. A heating device is pivotal into and out of a position between the two clamping elements with the clamped plastic pipe section and the clamped shaped plastic piece with levers pivotally seated on the base frame. The heating device has a heating element with a cupped section for placing over the plastic pipe section and a cylindrical section for insertion into the shaped plastic piece.

2. Description of the Prior Art

A conventional device is known from German Letters Patent DE-PS 27 34 911. When a heating device is pivoted into place, clamping elements with a clamped plastic pipe section and a clamped, shaped plastic piece are positioned in a direction towards a heating element. The cup-shaped section is placed over the plastic pipe section, so that the outside of the plastic pipe section is heated and plasticized. In addition, the cylinder-shaped section is inserted into the inside of the shaped plastic piece, so that the inside wall of the shaped plastic piece is heated and plasticized. Once plastification has progressed sufficiently, the heating device is pivoted away and the clamping elements are displaced towards each other far enough that the plastic pipe section is inserted into the shaped plastic piece. In the process, the heated and plasticized surfaces contact each other and are firmly connected with each other during cooling.

This conventional device is limited to use with a fixed exterior diameter of the plastic pipe section and a fixed interior diameter of the shaped plastic piece which has been adapted to it. However, when laying networks of plastic pipe, the diameter changes so that not only different devices are required but also different heating devices are required.

If the heating device as a whole, together with the levers, is changed, a large amount of time is lost in retooling for the welding work. The same is true if only the heating element of the heating device is exchanged. To do this, the heating element must first cool in order to be exchanged, and the new heating element must be heated before welding can continue. In either conventional case, expensive retooling times must be tolerated.

SUMMARY OF THE INVENTION

It is one object of this invention to improve the conventional device mentioned above in such a way that it is possible to use it for the insertion and welding of plastic pipe sections of different diameters into adapted shaped plastic pieces, without requiring excessive labor time associated with retooling.

This object is achieved in accordance with this invention in that the heating device has a plurality of different heating elements, each with a cupped section and a cylindrical section. The heating device itself is rotatably seated on pivot levers in such a way that with the heating device in a pivoted-in-place or set position, the heating elements can be optionally rotated or pivoted between the two clamping elements which hold the clamped plastic pipe section and the clamped shaped plastic piece.

The heating device maintains all heating elements attached to it in a heated condition, ready for use, so that it is only necessary to rotate the heating element needed for the welding process into its working position on the heating device. This is accomplished by a simple pivoting movement of the heating device on the pivot levers. The selected heating element must be aligned with a central axis of the clamping elements when the heating device is pivoted into place.

In accordance with one embodiment of this invention, when the pivot levers are pivoted into place, the rotating shaft of the heating device is positioned vertically above the central axis of the clamping elements and thus vertically above the clamped plastic pipe section and the clamped shaped plastic piece. The heating elements are arranged with their center axes on a circular path around the rotating shaft of the heating device. A radius of the circular path corresponds to the distance from the rotating shaft of the heating device, when pivoted into place, to the central axis of the clamping elements.

Pivoting into and out of the heating device with clear alignment towards the central axis of the clamping element is accomplished with two pivot levers that are rotatably seated on the back of the base frame and that extend with a horizontal section between the two clamping elements when the heating device is pivoted into place. The heating device is rotatably seated between the two pivot levers on the horizontal sections of the pivot levers.

The stability of the unit with the two pivot levers and the heating device is improved, compared to conventional units, since the two pivot levers are connected with a lateral support on their free ends and since a hand lever which eases operation is provided on the lateral support.

Exact rotational positions of the heating elements are ensured with a setting lever that has a locking device or the like positioned in an area of one pivot lever and the rotating shaft. Thus, the set rotational position of the heating device can be fixed.

In accordance with a further embodiment of this invention, alignment and clamping of the plastic pipe section is improved since the carriage with the clamping element for clamping the plastic pipe section has an additional clamping element, which is positioned on a side facing away from the pivotal heating device at a distance from a clamping element.

A relatively simple embodiment of this invention is distinguished by the heating device having a shape of a right-angled, isosceles triangle with rounded corners. The three heating elements are also positioned with their center axes near the corners of a right-angled, isosceles triangle. The axis of rotation is located on a center of the hypotenuse of this triangle.

This invention will be described in detail with a preferred embodiment illustrated in the drawings.

DESCRIPTION OF PREFERRED EMBODIMENTS

Figure 1:
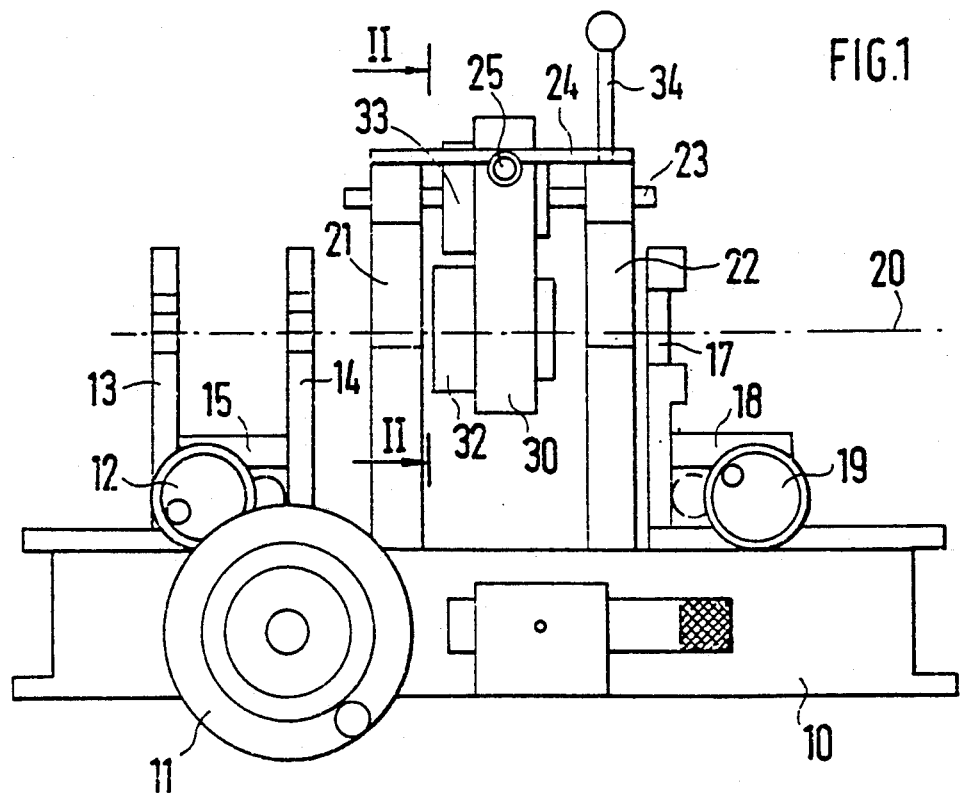
FIG. 1 is a device in accordance with one preferred embodiment of this invention, showing a front view of the device used as the operating side.

As shown in the view according to FIG. 1, two carriages 15 and 18 are adjustable with respect to each other and movable away from each other on the base frame 10 of the device. This adjustment is performed by rotational movement in both rotational directions of the hand wheel 11. The carriage 15 supports the two clamping elements 13 and 14, which are positioned at a distance from each other, for clampinq a plastic pipe section. The clamping elements 13 and 14 are displaced by means of the hand wheel 12. The carriage 18 supports the clamping element 17 for clamping the shaped plastic piece. The clamping element 17 is displaced by means of the hand wheel 19.

Figure 2:
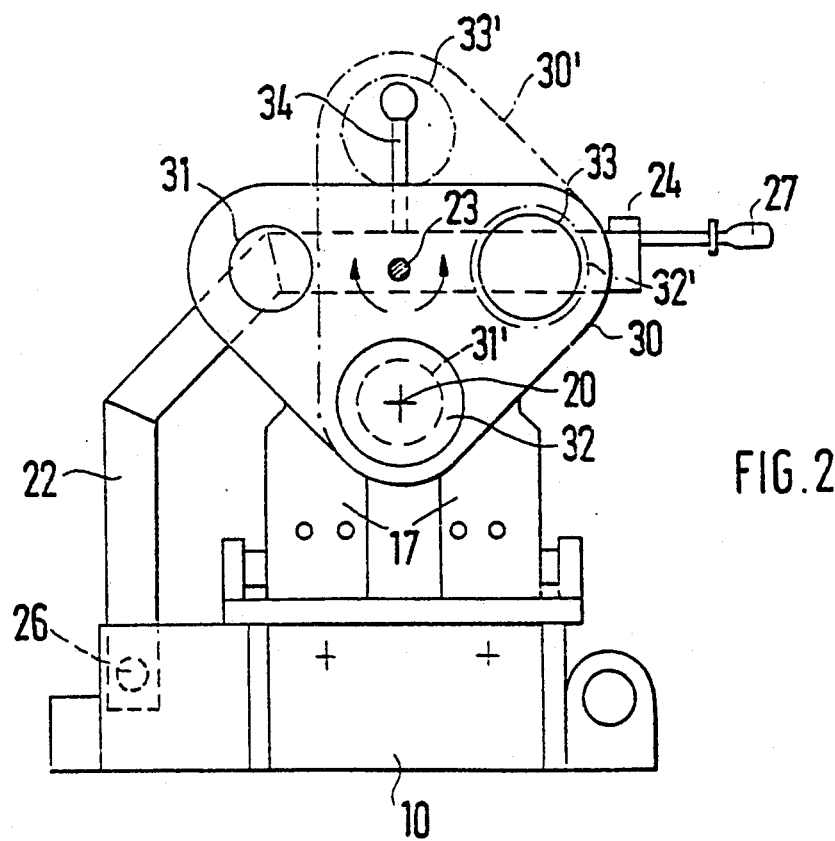
FIG. 2 is a view along the line II—II, as shown in FIG. 1.

As shown in the view according to FIG. 2, the two pivot levers 21 and 22 are pivotally mounted, by means of the pivot shaft 26, on the back of the base frame 10. The pivot levers 21 and 22 are formed in the shape of a projection and, in the position where they are pivoted into place, pivoted upright as shown in FIG. 2, they extend with horizontal sections between the clamping elements 14 and 17 and thus between the clamped plastic pipe section and the clamped shaped plastic piece. The free ends of the pivot levers 21 and 22 are rigidly connected with each other with the lateral support 24. The lateral support 24 is connected to the manual lever 27, by means of which the pivot levers 21 and 22, together with the heating device 30 supported thereon, can be pivoted into and out of position.

In the preferred embodiment shown in FIGS. 1 and 2, the heating device 30 supports three different heating elements 31, 32 and 33, which are adapted to different exterior diameters of plastic pipe sections and the associated interior diameters of shaped plastic pieces. For this purpose, the heating elements 31, 32 and 33 have, facing the clamping element 14, an appropriate cupped section for placing over the end of the plastic pipe section and, facing the clamping element 17, an appropriate cylindrical section for insertion into the inside of the shaped plastic piece.

When the heating device 30 is pivoted into place, the rotating shaft 23 of the heating device 30 is located above the central axis 20 of the clamping elements 13, 14 and 17 and thus above the clamped plastic pipe section and the clamped shaped plastic piece. All three heating elements 31, 32 and 33 are positioned the same distance from the rotating shaft 23, so that the central axis of every heating element 31, 32 and 33 can be aligned with the central axis of the clamping elements 13, 14 and 17 by a simple pivoting movement of the heating device 30 about the rotating shaft 23. As shown by the position indicated by dashed lines, of the rotated heating device 30', the heating element 31' is aligned with the central axis 20 if, as shown in FIG. 2, the heating device 30 is rotated by 90° counterclockwise. If, however, the heating device 30 is rotated 90° clockwise, the heating element 33 is aligned with the central axis 20. The disposition of the center axes of the heating elements 31, 32 and 33 on a circular path around the rotating shaft 23, not their number, is critical in this case. With the heating device 30 in a position where it is pivoted into place, the radius corresponds to the distance from the central axis 20, which is taken up by the rotating shaft 23 located vertically above the central axis 20.

The setting lever 25 is fixed in an area of the pivot lever 22 and the pivot shaft 23. A stop element or the like is associated with it which clearly determines and fixes the rotational positions of the heating device 30, so that the respective heating element 31, 32 or 33 which has been rotated into place is precisely aligned with the central axis 20. It is thus advantageous if at least a position where the pivot levers 21 and 22 are pivoted into place can be clearly limited and/or fixed with stops or the like.

For example, a setting lever 34 shown in FIGS. 1 and 2 has a locking device and is positioned near the pivot lever 22 and the rotating shaft 23 for fixing a set rotational position of the heating device 30.

We claim:

1. In an apparatus for inserting a plastic pipe section into a shaped plastic piece for welding according to a heating element method, wherein two carriages, each having a clamping element, are mounted on a base frame and can be displaced with respect to each other with a setting device, and a heating device is pivotal into and out of position between the two clamping elements with the clamped plastic pipe section and the clamped shaped plastic piece with levers pivotally mounted to the base frame, and the heating device has a heating element with a cupped section for placing over the plastic pipe section and a cylindrical section for insertion into the shaped plastic piece, the improvement comprising:

the heating device (30) having a plurality of different heating elements (31, 32, 33), each with a cupped section and a cylindrical section;

the heating device (30) rotatably mounted with respect to the pivot levers (21, 22) such that with the heating device (30) in a set position the heating elements (31, 32, 33) are rotatable between the two clamping elements (14, 17) which hold the clamped plastic pipe section and the clamped shaped plastic piece;

with the pivot levers (21, 22) pivoted into the set position a rotating shaft (23) of the heating device (30) positioned vertically above a central axis (20) of the clamping elements (14, 17) and vertically above the clamped plastic pipe section and the clamped shaped plastic piece;

the heating elements (31, 32, 33) are positioned within the heating device (30) with each center axis of each of the heating elements (31, 32, 33) arranged on a circumferential path around the rotating shaft (23) of the heating device (30), and a radius of the circumferential path is equal to a distance from a shaft center of the rotating shaft (23), when pivoted into the set position, to the central axis (20) of each of the respective clamping elements (14, 17); and the two pivot levers (21, 22) are pivotally mounted on a back portion of the base frame (10), each of the pivot levers (21, 22) having a horizontal section extending between a corresponding clamping element of the two clamping elements (14, 17) when the heating device (30) is pivoted into the set position, and the heating device (30) positioned between each of the horizontal sections of the pivot levers (21, 22).

2. In an apparatus according to claim 1, further comprising a lateral support (24) secured between free ends of the pivot levers (21, 22), and a hand lever (27) secured to the lateral support (24).

3. In an apparatus according to claim 2, further comprising a setting lever (34) having a locking device, the setting lever (34) positioned near one of the pivot levers (22) and the rotating shaft (23), for fixing a set rotational position of the heating device (30).

4. In an apparatus according to claim 3, further comprising an additional clamping element (13) connected to a carriage (15) which is connected to one clamping element (14) of the two clamping elements (14, 17) for clamping the plastic pipe section, and the additional clamping element (13) being positioned on a side of the one clamping element (14) facing away from the heating device (30) at a distance from the one clamping element (14).

5. In an apparatus according to claim 4, wherein the heating device (30) has an overall triangular shape, with rounded corners, the heating elements (31, 32, 33) are positioned with the center axes located near corners of the overall triangular shape, and the rotating shaft (23) is located at a center of a hypotenuse of a right-angled, isosceles triangle formed between the center axes of three of the heating elements (31, 32, 33).

6. In an apparatus according to claim 1, further comprising a setting lever (34) having a locking device, the setting lever (34) positioned near one of the pivot levers (22) and the rotating shaft (23), for fixing a set rotational position of the heating device (30).

7. In an apparatus according to claim 1, further comprising an additional clamping element (13) connected to a carriage (15) which is connected to one clamping element (14) of the two clamping elements (14, 17) for clamping the plastic pipe section, and the additional clamping element (13) being positioned on a side of the one clamping element (14) facing away from the heating device (30) at a distance from the one clamping element (14).

8. In an apparatus according to claim 1, wherein the heating device (30) has an overall triangular shape with rounded corners, the heating elements (31, 32, 33) are positioned with center axes of the heating elements (31, 32, 33) located near corners of the overall triangular shape, and the rotating shaft (23) is located at a center of a hypotenuse of a right-angled, isosceles triangle formed between the center axes of three of the heating elements (31, 32, 33).

* * * * *